US009112708B1

(12) United States Patent
Arad et al.

(10) Patent No.: US 9,112,708 B1
(45) Date of Patent: Aug. 18, 2015

(54) PROCESSING MULTICAST PACKETS IN A NETWORK DEVICE

(71) Applicant: Marvell Israel (M.I.S.L) Ltd., Yokneam (IL)

(72) Inventors: Carmi Arad, Nofit (IL); Gil Levy, Hod Hasharon (IL); Lior Valency, Tel Aviv (IL); Amir Roitshtein, Holon (IL); Sharon Ulman, Kfar Yehoshua (IL); Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 108 days.

(21) Appl. No.: 13/752,042

(22) Filed: Jan. 28, 2013

Related U.S. Application Data

(60) Provisional application No. 61/591,664, filed on Jan. 27, 2012.

(51) Int. Cl.
*H04L 12/56* (2006.01)
*H04L 12/18* (2006.01)

(52) U.S. Cl.
CPC ...................................... *H04L 12/18* (2013.01)

(58) Field of Classification Search
USPC .......................................................... 370/390
See application file for complete search history.

(56) References Cited

U.S. PATENT DOCUMENTS

| 6,032,190 | A | * | 2/2000 | Bremer et al. ................. 709/238 |
| 6,807,179 | B1 | | 10/2004 | Kanuri et al. |
| 7,636,319 | B2 | | 12/2009 | Shankar et al. |
| 7,729,351 | B2 | * | 6/2010 | Tatar et al. ..................... 370/390 |
| 7,991,926 | B1 | | 8/2011 | Arad |
| 8,358,651 | B1 | | 1/2013 | Kadosh et al. |
| 2007/0168531 | A1 | | 7/2007 | Sitaraman et al. |
| 2008/0037531 | A1 | | 2/2008 | Donoghue et al. |
| 2008/0315985 | A1 | | 12/2008 | Johnsen et al. |
| 2010/0142398 | A1 | | 6/2010 | Arad et al. |
| 2011/0007741 | A1 | | 1/2011 | Kreeger et al. |
| 2011/0149729 | A1 | * | 6/2011 | Benner et al. ................. 370/230 |
| 2011/0164616 | A1 | | 7/2011 | Kloth et al. |
| 2013/0223281 | A1 | * | 8/2013 | Pandit ........................... 370/254 |

FOREIGN PATENT DOCUMENTS

CN          1677952 A      *  10/2005

OTHER PUBLICATIONS

The Internet Society, RFC3569, An overview of source specific multicast (SSM), Jul. 2003.*
The Internet Society, RFC3376, Internet Group Management Protocol, Version 3, Oct. 2002.*
The Internet Society, RFC3208, PGM Reliable Transport Protocol Specifications, Dec. 2001.*

* cited by examiner

*Primary Examiner* — Melvin Marcelo
*Assistant Examiner* — Peter Solinsky (57) ABSTRACT

A network switch device comprises a packet processor configured to: write, to a memory, at least a payload of a multicast packet received via one of a plurality of ports, determine that a plurality of instances of the multicast packet are to be transmitted, generate, using an original header of the multicast packet, one or more additional headers, write, to the memory, a plurality of headers including (i) the original header, and (ii) the one or more additional headers in the memory, link each header in the plurality of headers stored in the memory to a location of the payload in the memory, and transmit a plurality of instances of the multicast packet via one or more ports including, for each instance of the multicast packet, reading (i) a respective one of the headers from the memory and (ii) the payload from the location in the memory.

24 Claims, 5 Drawing Sheets

PROCESSING MULTICAST PACKETS IN A NETWORK DEVICE

CROSS-REFERENCES TO RELATED APPLICATIONS

This disclosure claims the benefit of U.S. Provisional Patent Application No. 61/591,664, entitled "Minimization of Queued Control Information," filed on Jan. 27, 2012, the disclosure of which is incorporated herein by reference.

FIELD OF THE DISCLOSURE

The present disclosure relates generally to network switch devices and, more particularly, to techniques for processing multicast packets in network switch devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In one known approach, a packet is received by a network switch, and the packet is then stored in a buffer. When it is determined that the packet is a multicast packet and is to be transmitted via multiple N ports of the network switch, the entire packet is duplicated to provide N−1 additional copies of the packet, and the N−1 additional copies are stored in the buffer. The N multicast packets are then read from the buffer and transmitted via N respective ports.

SUMMARY

In one embodiment, a network switch device comprises a plurality of ports, a memory, and a packet processor. The packet processor is configured to: write, to the memory, at least a payload of a multicast packet received via one of the ports in the plurality of ports, determine that a plurality of instances of the multicast packet are to be transmitted, generate, using an original header of the multicast packet, one or more additional headers, write, to the memory, a plurality of headers including (i) the original header, and (ii) the one or more additional headers in the memory, link each header in the plurality of headers stored in the memory to a location of the payload in the memory, and transmit a plurality of instances of the multicast packet via one or more ports including, for each instance of the multicast packet, reading (i) a respective one of the headers in the plurality of headers from the memory and (ii) the payload from the location in the memory.

In another embodiment, a method includes receiving a multicast packet via one port of a plurality of ports of a network switch device, and storing at least a payload of the multicast packet in a memory device. The method also includes determining, with a packet processor of the network switch device, that a plurality of instances of the multicast packet are to be transmitted via one or more ports of the network switch device. Additionally, the method includes generating, with the packet processor, one or more additional headers based on an original header of the multicast packet. The method further includes storing, in the memory, a plurality of headers including (i) the original header, and (ii) the one or more additional headers, and linking, with the packet processor, each header in the plurality of headers stored in the memory to a location of the payload in the memory. The method also includes transmitting a plurality of instances of the multicast packet via one or more ports including, for each instance of the multicast packet, reading (i) a respective one of the headers in the plurality of headers and (ii) the payload from the location in the memory.

DETAILED DESCRIPTION

Figure 1:
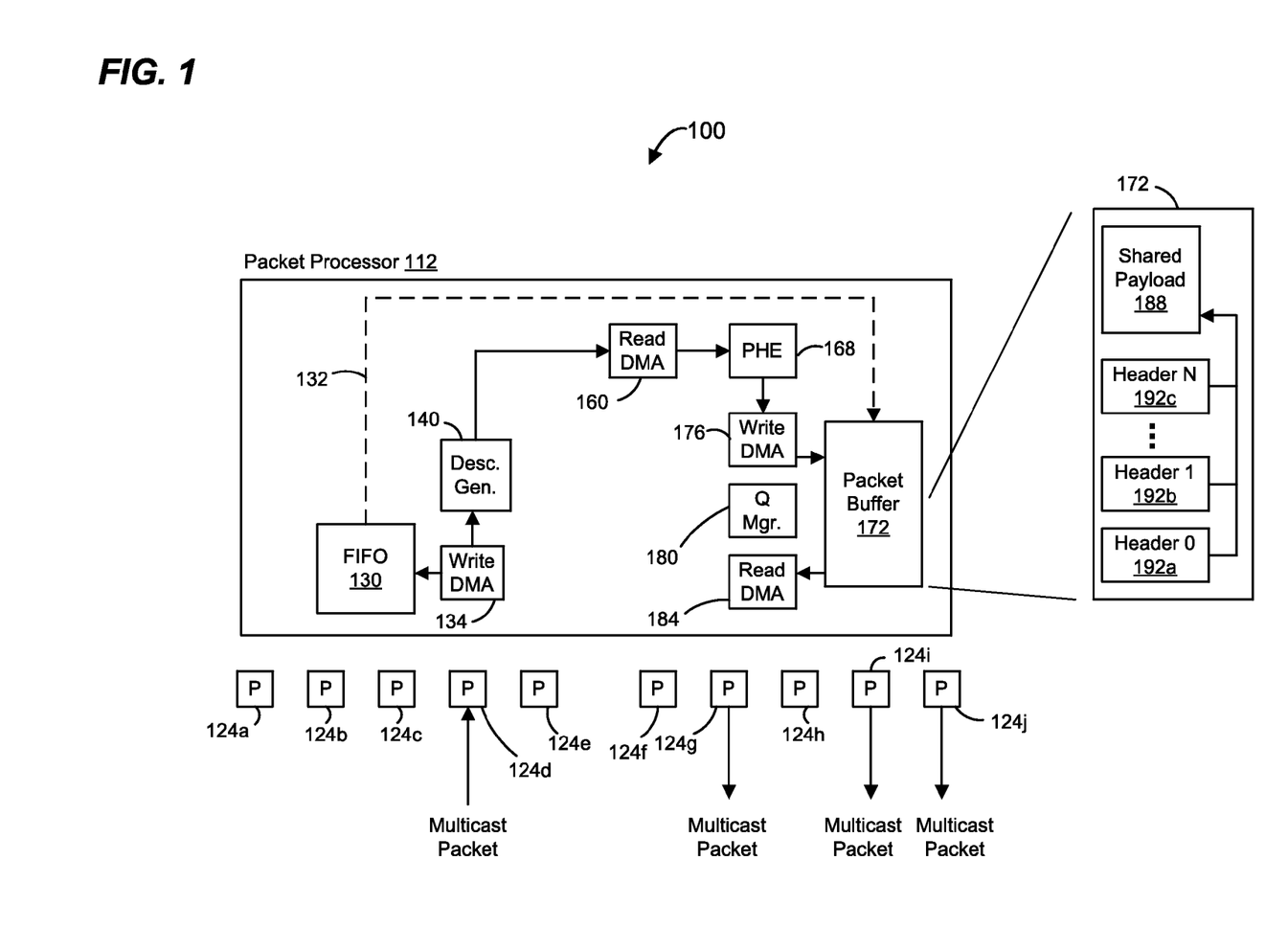
FIG. 1 is a block diagram of an example network switch device, according to an embodiment.

FIG. 1 is a block diagram of an example network switch device 100, according to an embodiment. The network switch device 100 comprises a packet processor 112, in an embodiment. The packet processor 112 is associated with a plurality of ports 124. Although ten ports 124 are illustrated in FIG. 1, other suitable numbers of ports are utilized in other embodiments.

The packet processor 112 is configured to perform ingress processing functions on received packets. In an embodiment, ingress processing includes determining one or more target ports via which the packet corresponding to the descriptor is to be transmitted. In an embodiment, determining the target port(s) includes analyzing one or more fields of a header of the packet, including one or more of an address (e.g., a destination media access control (MAC) address, an Internet Protocol (IP) address, etc.), a virtual local area network (VLAN) identifier, etc. For example, the packet processor 112 may store, in a memory, indications of associations between (i) target ports and (ii) addresses (e.g., MAC addresses, IP addresses, etc.). In other embodiments, the packet processor 112 is configured to perform other suitable ingress processing functions in addition to or instead of making a forwarding decision. For example, in some embodiments, the packet processor 112 is configured to analyze packet header fields to perform one or more of a tunnel termination function, assign a VLAN, perform an ingress policy control function, etc.

In some embodiments, the packet processor 112 is also configured to perform egress processing of packets, and to transmit the packets via one or more ports 124. In various embodiments, egress processing includes one or more of multicast packet replication, alteration or editing of packet headers, egress metering and policing, egress ACL (Access Control List) for security, egress traffic management (e.g., scheduling transmission of packets, traffic volume management, etc.) determining if packets should be dropped for security reasons, performing flow control functions, measuring flow statistics, performing egress policing to ensure that traffic in a flow remains within terms of a service agreement, etc.

The packet processor 112 includes or is coupled to a memory 130, and the ingress processor 112 is configured to store packets received via the ports 124 in the memory 130. In particular, a memory interface device 134 is configured to store packets received via the ports 124 in the memory 130, in an embodiment. The memory interface device 134 is configured to write packets to the memory 130, in an embodiment. In an embodiment, the memory interface device 134 comprises a direct memory access (DMA) device. In an embodiment, the packet processor 112 is configured to store a packet in the memory 130 generally for a time period necessary for performing ingress processing of the packet. In some embodiments, the amount of time necessary for performing ingress processing of the packet has a known upper bound. The memory 130 is a first-in-first-out (FIFO) memory, in an embodiment. In other embodiments, the memory 130 is another suitable device.

As will be described in more detail below, after a first set of processing operations have been performed with respect to a packet (e.g., ingress processing operations), the packet is transferred (as indicated by the arrow 132) from the memory 130 to a packet buffer memory 172, where the packet is stored while performing a second set of processing operations with respect to the packet (e.g., egress processing operations), in an embodiment. Unlike the amount of time necessary for performing ingress processing of the packet, the amount of time necessary for performing at least some egress processing operations (e.g., transmit scheduling, rate limiting, etc.) does not have a known upper bound, in some embodiments.

The packet processor 112 includes a descriptor generator 140 that is configured to generate a packet descriptor for each packet received via the ports 120. In an embodiment, a packet descriptor comprises information about the packet that is relevant for processing the packet. As will be described in more detail below, the packet descriptor is analyzed, transferred between processing elements in the packet processor 112, modified, etc., in various embodiments, and generally acts as a surrogate for the packet while the packet is stored in the memory 130 and/or the memory 172. Because the packet descriptor is smaller than the packet to which it corresponds, in some embodiments, the packet descriptor is more easily and quickly transferred between processing elements than would be the packet itself. In various embodiments, the packet descriptor includes one or more of an indication of the length of the packet, an indication of a location of the packet in the memory (e.g., in the memory 130 and/or the memory 172), one or more instructions for editing a header of the packet, indication(s) of service attribute(s), indication(s) of one or more target ports via which the packet is to be transmitted, an indication of a port via which the packet was received, etc., in various embodiments. The indication of the location of the packet in the memory includes a pointer, in an embodiment.

In some embodiments, the descriptor additionally or alternatively includes one or more fields from a header of the packet, such as one or more address fields, one or more VLAN tags or identifiers, etc.

As the packet descriptor is processed by different processing elements in the packet processor 112, at least some of the processing elements modify the packet descriptor and thus affect subsequent processing functions performed by other processing elements. For example, as mentioned above, the packet descriptor includes instructions indicating operations that are to be performed by processing elements of the packet processor 116, in an embodiment. At least in some scenarios, a first processing element analyzes the packet descriptor and inserts and/or adds an instruction to the packet descriptor that indicates a processing function to be performed subsequently by a second processing element, in an embodiment. For example, in an embodiment, the packet descriptor is generated or modified to include an instruction indicating how a header of the packet is to be edited subsequently by the packet processor 112. As another example, the descriptor is generated or modified (e.g., by a forwarding engine (not shown)) to include indication(s) of the port(s) 124 via which the packet is to be transmitted, and a subsequent processing element then analyzes the indication of the target port 124 to enqueue the descriptor in a transmit queue corresponding to the target port 124, in an embodiment. If the packet is to be transmitted via a set of multiple ports 124, the descriptor is generated or modified to include an indication of the set, in an embodiment.

The packet processor 112 is configured to retrieve the packet from the memory 130 after ingress processing functions are completed, in an embodiment. In particular, a memory interface device 160 is configured to retrieve the packet from the memory 130 in response to receiving the packet descriptor corresponding to the packet, in an embodiment. The memory interface device 160 includes a DMA engine, in an embodiment.

Packets retrieved by the memory interface device 160 are processed by a packet header editor (PHE) unit 168, in an embodiment. The PHE unit 168 is configured to modify a header of the packet by one or more of: altering fields in the header, removing fields from the header, adding fields to the header, etc. The PHE unit 168 is configured to modify a header according to instructions included in the packet descriptor corresponding to the packet, in an embodiment. In an embodiment, the PHE unit 168 is also configured to shorten the packet descriptor by, for example, removing the instructions included in the descriptor that indicate to the PHE unit 168 how the header is to be altered, in an embodiment.

The packet processor 112 is configured to store the packet, including the altered header, to the memory 172. In particular, a memory interface device 176 is configured to store the packet to the memory 172, in an embodiment. The memory interface device 176 includes a DMA engine, in an embodiment. The memory 172 is a buffer configured to store packets in preparation for transmission via one or more of the ports 128, in an embodiment.

The descriptor, now significantly shorter by removal of the packet header editing instructions by the PHE unit 168, in an embodiment, is provided to a queue manager unit 180. The queue manager unit 180 is configured to enqueue packet descriptors in sets of queues corresponding to ports 124, in an embodiment. Each set of queues corresponding to a port 124 includes multiple queues corresponding to different priorities and/or classes of service, in an embodiment.

When a packet descriptor is retrieved from one of the queues of the queue manager unit 180, the packet descriptor is provided to a memory interface device 184 that is configured to retrieve the corresponding packet from the memory 172 in response to receiving the descriptor, in an embodiment. The memory interface device 184 includes a DMA engine, in an embodiment.

With regard to multicast packets, the packet processor 112 is configured to replicate the header of the packet for multiple instances of the multicast packet that are to be transmitted by the packet processor 112. For example, when it is determined that the multicast packet is to be transmitted via multiple ports of the network switch, the header of the multicast packet is replicated to provide additional copies of the header without duplicating the payload of the packet, in an embodiment. In an embodiment, the PHE unit 168 is configured to replicate the header of a multicast packet. For example, the PHE unit 168 includes a header replication unit configured to replicate the header of a multicast packet, in an embodiment. In another embodiment, the header replication unit is separate from the PHE unit 168. In an embodiment, a new packet descriptor is generated for each replicated header. For example, the header replication unit includes a descriptor replication unit that is configured to generate a new descriptor for each replicated header, in an embodiment. In another embodiment, the descriptor replication unit is separate from the header replication unit. As will be described in more detail below, all of the headers (i.e., the original header and the replicated headers) are associated with a single instance of the packet payload, in an embodiment. Each descriptor points to a corresponding one of the different headers. For example, in some embodiments in which the original header and the replicated headers are stored in the memory 172, each descriptor includes an indicator of a location of the corresponding header in the memory 172.

The memory interface device 176 is configured to store a shared payload 188 of the multicast packet and the multiple headers 192 in the memory 172 such that multiple ones of the headers 192 are linked to the shared payload 188, in an embodiment. For example, in an embodiment, each header 192 includes a pointer or another suitable indicator that points to or otherwise indicates one or more memory locations in the memory 172 linking to the shared payload 188. In an embodiment, only one shared payload 188 is stored in the memory 172 when there is more than one multicast packet having the payload 188 to be transmitted via one or more ports 124. In an embodiment, if there are N multicast packets to be transmitted via one or more ports 124, the number of payloads 188 stored in the memory 172 is less than N. In an embodiment, if there are N multicast packets to be transmitted via one or more ports 124, only one shared payload 188 is stored in the memory 172.

The descriptors are enqueued by the queue manager 180 to schedule multiple instances of the multicast packet for transmission. When it is time to transmit a particular instance of the multicast packet, as indicated by a scheduling of a corresponding enqueued descriptor, the header 192 corresponding to the descriptor and the payload 188 are read from the memory 172, and the instance of the multicast packet is transmitted via a port 124. For instance, when transmitting a multicast packet via a port 124, the packet processor 112 is configured to read the shared payload 188 and the appropriate header 192 from the memory 172, in an embodiment. For example, the memory interface unit 184 is configured to read the appropriate header 192 and the shared payload 188 from the memory 172, in an embodiment. The memory interface unit 184 is configured to read the appropriate header 192 from the memory 172 in response to receiving a descriptor corresponding to the header 192, and the header 192 points to or otherwise indicates the shared payload 188, in an embodiment.

In other embodiments, the network switch device 100 includes a plurality of packet processors disposed on a single integrated circuit (IC) device or multiple separate IC devices, and some of the elements of the packet processor 112 described above are located in different packet processors. For example, in some embodiments, ingress processing operations are performed in a first packet processor associated with a source port 124 via which the packet is received, and a corresponding descriptor is then transferred to a second packet processor associated with one or more target ports 124 via which the packet (or instances of the packet) is to be transmitted. The second packet processor then performs egress processing operations. In some embodiments, the first packet processor and the second packet processor are interconnected by a distributor (not shown). In embodiments including a distributor (not shown), the distributor includes a switch fabric configured to interconnect multiple packet processors, in an embodiment. The distributor includes one or more crossbar devices configured to interconnect multiple packet processors, in an embodiment. In some embodiments with multiple packet processors, each packet processor is configured to perform both ingress processing operations and egress processing operations such as described above.

Figure 2:
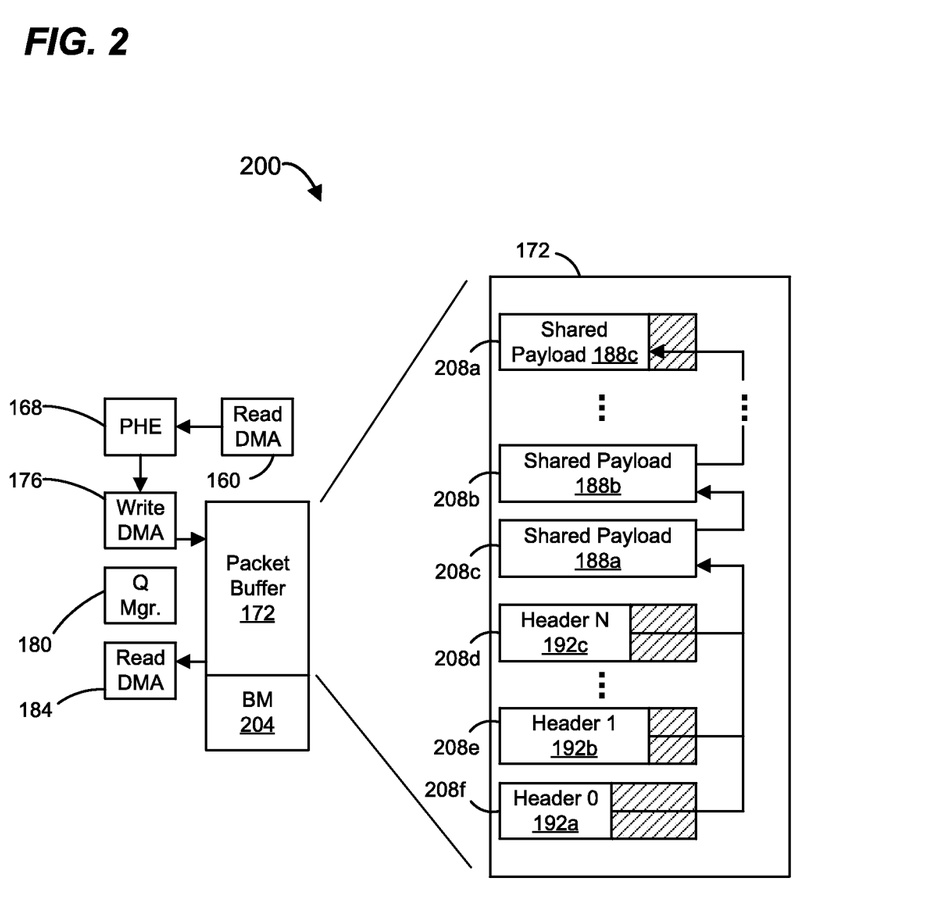
FIG. 2 is a block diagram of an example egress processor of a network switch device, according to another embodiment.

FIG. 2 is a block diagram of an egress processing portion 200 of a packet processor, according to an embodiment. The egress processing portion 200 is similar to an egress processing portion of the packet processor 112 of FIG. 1 and includes like-numbered elements that will not be described again in detail for sake of brevity.

In other embodiments, generation and processing of packet descriptors such as described above is omitted. Rather, in some embodiments, a header of the packet is processed by and transferred between processing elements of the packet processor, and processing elements make changes to the header when appropriate.

In the embodiment illustrated in FIG. 2, a buffer or queue management unit 204 is coupled to the memory 172. The buffer management unit 204 is configured to structure the memory 172 as a plurality of buffers 208 in which packets are stored, in an embodiment. The buffers 208 are fixed length buffers, in an embodiment. All of the buffers 208 are the same size, in an embodiment. Different buffers 208 have different sizes, in an embodiment.

The buffer management unit 204 is configured to allocate buffers 208 for storage of packets and multicast headers. When a packet spans multiple buffers 208, the buffer management unit 204 is configured to link together the multiple buffers. In an embodiment, when a packet spans multiple buffers 208, each buffer 208 includes a pointer or other indicator of the next buffer 208, if any. For example, as illustrated in FIG. 2, the shared payload 188 spans multiple buffers 208, and buffer 208*c* includes pointer or indicator of the next buffer 208, buffer 208*b*, that stores another portion of the shared payload 188.

In an embodiment, each header of N multicast packets is stored in a respective buffer 208, and each buffer storing a header includes a pointer or other indicator of the buffer 208 that stores the first portion of the shared payload 188. For example, buffer 208*f* stores multicast header 192*a*, and buffer 208*f* includes a pointer or other indicator of the buffer 208*c*, which stores the first portion of the shared payload 188.

In some embodiments, any particular buffer 208 can be utilized to store either payload data or header data. In other embodiments, however, a first set of buffers 208 is defined for storing payload data, whereas a second set of buffers 208 is defined for storing header data. For example, in some embodiments buffers 208 for storing header data have a different buffer size as compared to buffers 208 for storing payload data. In an embodiment, the size of buffers 208 for storing header data and the size of buffers 208 for storing payload data are optimized for efficient memory utilization.

In an embodiment, the memory interface unit 184 is configured to utilize the pointers/indicators discussed above to read a packet spanning multiple buffers 208 from the memory 172. For example, after reading data from a first buffer 208 (e.g., 208*c*), the memory interface unit 184 is configured to utilize a pointer/indicator in or associated with the first buffer 208 to determine the buffer 208 (e.g., the buffer 208*b*) that stores the next portion of the payload 188.

Referring now to FIGS. 1 and 2, in some embodiments, the first memory 130 and the second memory 172 are included in separate memory devices. In other embodiments, the first memory 130 and the second memory 172 are different portions of a single memory device.

In some embodiments, the memory 130 and the memory interfaces 160 and 176 are omitted and, when the packet processor 112 receives a packet via a source port 124, the memory interface 130 writes at least a payload of the received packet to the memory 172. Processing of a descriptor corresponding to the packet, and/or processing of the header of the packet, is performed, in a manner similar to the techniques described above, while at least the packet payload remains stored in the memory 172.

Figure 3A:
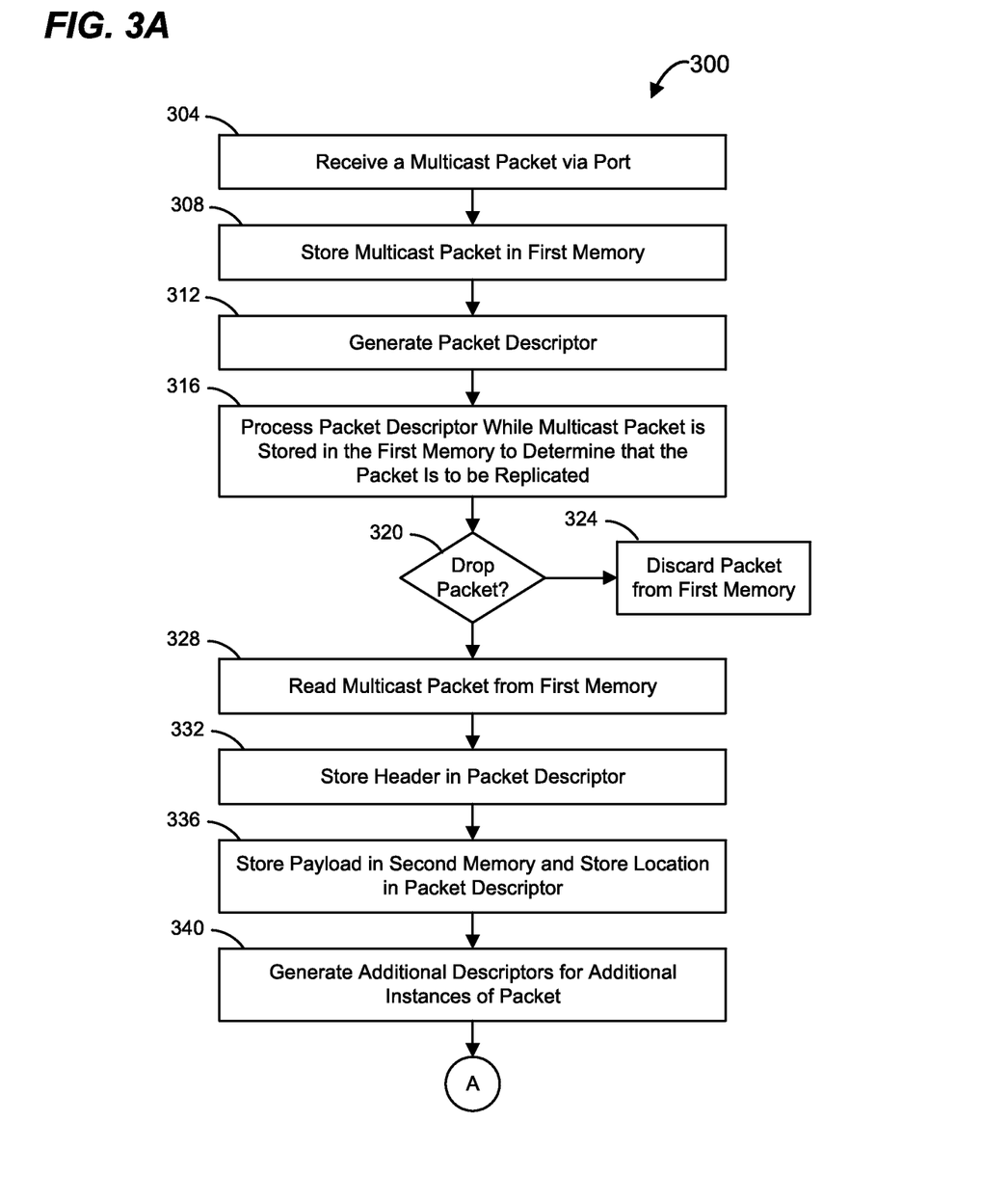
FIGS. 3A and 3B illustrate a flow diagram of an example method for processing a multicast packet in a network switch, according to an embodiment.
Figure 3B:
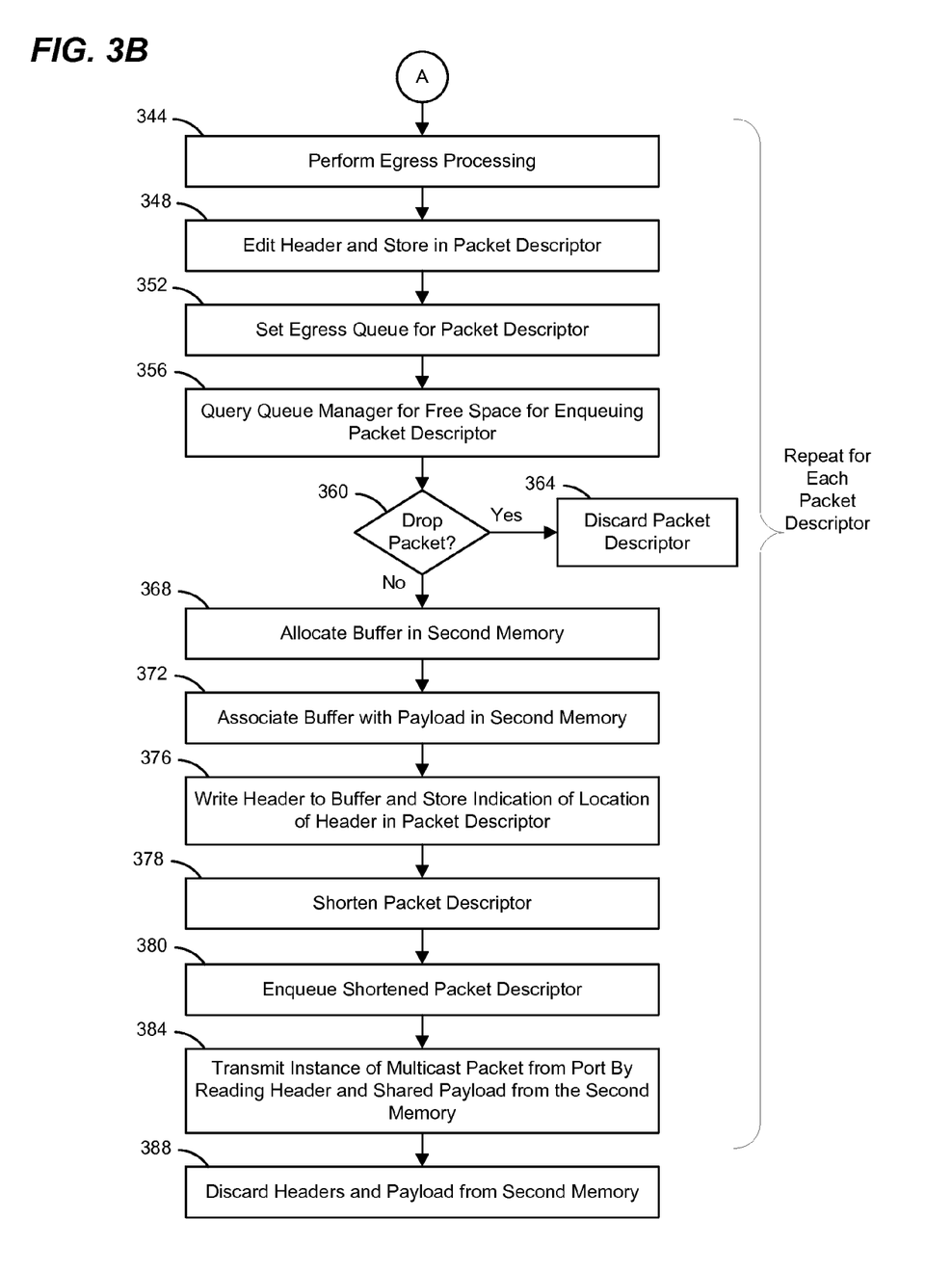

FIGS. 3A and 3B illustrate a flow diagram of an example method 300 for processing a multicast packet in a network switch, according to an embodiment. The switch device 100 of FIG. 1 is configured to implement the method 300, in an embodiment. A switch device having the egress processing portion 200 of FIG. 2 is configured to implement the method 300, in an embodiment. The method 300 is described with reference to FIGS. 1 and 2 for explanatory purposes. In other embodiments, however, the method 300 is implemented by another suitable switch device.

At block 304, a multicast packet is received via a network port of the switch device. For example, the packet is received via the network port 124d associated with the ingress processor 112. At block 308, the multicast packet is stored in a first memory. For example, the ingress processor 112 (e.g., the memory interface device 134) stores the multicast packet in the memory 130, in an embodiment.

At block 312, the ingress processor 112 generates a packet descriptor corresponding to the multicast packet. For example, the packet descriptor generator 140 generates the packet descriptor, in an embodiment. The packet descriptor is typically much smaller than the packet itself, in some embodiments and/or implementations. The packet descriptor includes information such an indication of a source port via which the packet was received, an indication of the location in first memory at which the packet is stored, an indicator of a length of the packet, etc.

At block 316, the ingress processor 112 performs ingress processing functions on the packet descriptor. In an embodiment, ingress processing includes determining that the packet to which the descriptor corresponds is a multicast packet and multiple instances of the packet need to be transmitted. In an embodiment, ingress processing includes determining how many instances of the packet are needed. In an embodiment, ingress processing includes determining how a respective header of each instance of the packet to be transmitted is to be edited and storing indication(s) of instruction(s) for editing the headers in the packet descriptor.

In an embodiment, ingress processing includes making a forwarding decision such as determining one or more target network ports via which multiple instances of the packet are to be transmitted. In some embodiments, ingress processing includes analyzing the descriptor to perform one or more of assigning a VLAN, performing an ingress policy control function, etc. The multicast packet 130 remains stored in the first memory (e.g., the memory 130) while the ingress processor 112 performs ingress processing functions on the descriptor, in an embodiment.

At block 320 it is determined whether the packet is to be dropped. For example, in some embodiments, ingress processing performed at block 316 indicates whether the packet should be dropped (e.g., for security reasons, because of network congestion, etc.), and block 320 is performed using results of the ingress processing. If it is determined that the packet is to be dropped, the flow proceeds to block 324, at which the packet is discarded from the first memory (e.g., the memory 130).

On the other hand, if it is determined at block 320 that the packet is not to be dropped, the flow proceeds to block 328. At block 328, the multicast packet is retrieved from the first memory (e.g., the memory 130). For example, the memory interface device 160 retrieves the multicast packet from the first memory (e.g., the memory 130), in an embodiment.

At block 332, at least a portion of the header of the packet is stored in the packet descriptor corresponding to the packet. At block 336, at least the payload of the packet is stored in a second memory (e.g., the memory 172), and an indicator of the location of the payload in the second memory is stored in the packet descriptor. In an embodiment, if block 332 comprises storing a portion of the header in the packet descriptor, block 336 comprises storing in the second memory a remaining portion of the header and the payload.

At block 340, one or more additional packet descriptors are generated, the one or more additional packet descriptors corresponding to one or more additional instances of the multicast packet that are to be transmitted. In an embodiment, block 340 includes storing meta-data in each packet descriptor such as one or more of a target port for corresponding instance of the multicast packet, an indicator of the location of the payload in the second memory, an indicator of the packet length, an indicator of a class-of-service associated with the instance of the packet, etc. In an embodiment, if meta-data for the packet descriptor generated at block 312 has not yet been stored in the packet descriptor generated at block 312 or needs to be overwritten, block 340 includes storing appropriate meta-data for the packet descriptor generated at block 312.

Blocks 344, 348, 352, 356, 360, 364, 368, 372, 376, 378, 380, and 384, described below with reference to FIG. 3A, are repeated for each packet descriptor generated at blocks 312 and 340, in an embodiment. Blocks 344, 348, 352, 356, 360, 364, 368, 372, 376, 378, 380, and 384 are repeated for each packet descriptor corresponding to an instance of the multicast packet, in an embodiment.

At block 344, egress processing of the packet descriptor is performed. In an embodiment, egress processing includes one or more of performing egress access control list processing, metering, rate limiting functions that include marking packets that are to be dropped, etc. Marking a packet to be dropped includes storing a drop indicator in the corresponding packet descriptor, in an embodiment.

At block 348, the header stored in the descriptor is edited. In an embodiment, the header is edited according to header editing instruction(s) determined at block 316.

At block 352, an egress queue in which the packet descriptor is to be enqueued is determined. Determining the egress queue is based on the indicator of the target port stored in the packet descriptor, in an embodiment. Determining the egress queue is also based on a class-of-service indicator stored in the packet descriptor, in an embodiment.

At block 356, the queue manager 180 is queried for free space in the queue determined at block 352 for storing the descriptor.

At block 360, it is determined whether to drop the instance of the packet corresponding to the packet descriptor. For example, block 360 includes determining if egress processing at block 344 marked the packet for dropping, in an embodiment. Block 360 includes determining whether the queue manager indicated there is free space in the queue for enqueuing the packet descriptor, in an embodiment. For example, if the packet descriptor cannot be enqueued in the queue determined at block 352, it is determined that the packet is to be dropped, in an embodiment.

If it is determined that the instance of the packet is to be dropped, the flow proceeds to block 364. At block 364, the packet descriptor is discarded. On the other hand, if it is determined that the instance of the packet is not to be dropped, the flow proceeds to block 368.

At block 368, a buffer in the second memory is allocated for storing the header corresponding to the instance of the packet. For example, the buffer manager 204 allocates the buffer in the memory 172, in an embodiment.

At block 372, the buffer allocated at block 368 is associated with the payload stored in the second memory. For example, the buffer manager 204 associates the buffer with the payload stored in the memory 172, in an embodiment. The buffer manager 204 stores in the buffer a pointer to the payload, in an embodiment.

At block 376, the header stored in the packet descriptor is written to the buffer allocated at block 368. Additionally, an indicator of the location of the header in the memory 172 is stored in the packet descriptor.

At block 378, the packet descriptor is shortened. For example, the header is removed from the packet descriptor, in an embodiment. As another example, instructions for editing the header are removed from the packet descriptor, in an embodiment. In an embodiment, the shortened packet descriptor includes only the indicator of the location of the header in the memory 172. In an embodiment, the shortened packet descriptor includes only the indicator of the location of the header in the memory 172 and the indicator of the length of the packet. In an embodiment, the shortened packet descriptor includes additional suitable information.

At block 380, the shortened packet descriptor is enqueued in the queue determined at block 352. In an embodiment, because the packet descriptor has been shortened, a memory size for the egress queues can be smaller than would otherwise be needed.

At block 384, the instance of the multicast packet is transmitted via the corresponding network port 124. In particular, the corresponding header and the shared payload are read from the second memory and then the instance of the multicast packet is transmitted via the corresponding network port 124. For example, the memory interface unit 184 is configured to read the appropriate header 192 and the shared payload 188 from the memory 172, in an embodiment. The memory interface unit 184 is configured to read the appropriate header 192 from the memory 172 in response to receiving a descriptor corresponding to the header 192, and the header 192 points to or otherwise indicates the shared payload 188, in an embodiment.

At block 388, the headers 192 and the payload 188 are discarded from the second memory 172. The payload 188 is discarded after all instance of the multicast packet have been transmitted. In an embodiment, each header is discarded after the header is no longer needed. In another embodiment, the headers are discarded after all instances of the multicast packet have been transmitted.

Referring now to FIGS. 1, 2, 3A, 3B, in some embodiments, the memory 130 is omitted. For example, in an embodiment, when a packet is received by the network switch device 100, the packet is stored in the memory 172 at block 308, and blocks 328 and 336 are omitted.

Figure 4:
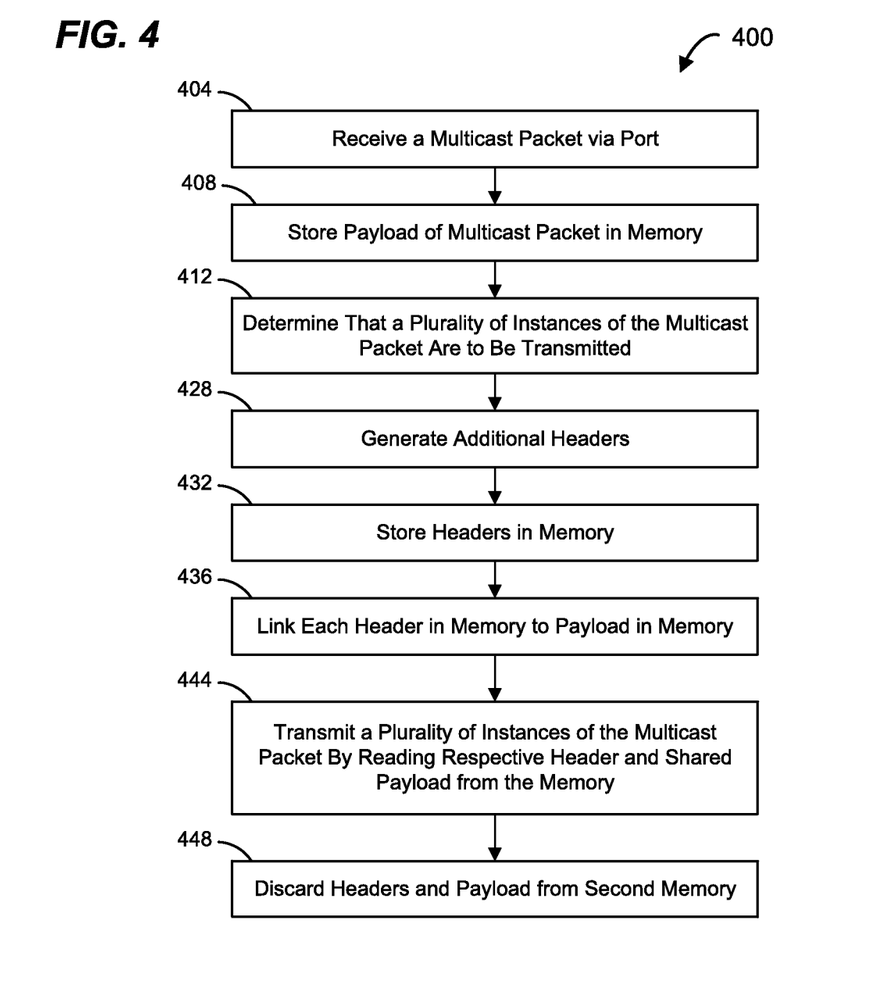
FIG. 4 is a flow diagram of an example method for processing a multicast packet in a network switch, according to an embodiment.

FIG. 4 is a flow diagram of another example method 400 for processing a multicast packet in a network switch, according to an embodiment. The switch device 100 of FIG. 1 is configured to implement the method 400, in an embodiment.

A switch device having the egress processing portion 200 of FIG. 2 is configured to implement the method 400, in an embodiment. The method 400 is described with reference to FIGS. 1 and 2 for explanatory purposes. In other embodiments, however, the method 400 is implemented by another suitable switch device.

At block 404, a multicast packet is received via a network port of the switch device. For example, the packet is received via the network port 124d associated with the packet processor 112. At block 408, at least the payload of the multicast packet is stored in a memory. For example, the packet processor 112 writes at least the payload of the multicast packet to the memory 172, in an embodiment.

At block 412, the packet processor 112 determines that a plurality of instances of the multicast packet are to be transmitted via one or more ports 124, in an embodiment.

At block 428, one or more additional headers of the additional instances of the multicast packet are generated. In an embodiment, the packet processor 112 is configured to replicate an original header of the multicast packet.

At block 432, a plurality of headers are stored in the memory, the plurality of headers including the original header and the one or more additional headers generated at block 428, in an embodiment.

At block 436, each header stored in the memory at block 432 is linked to the shared payload 188. The memory interface device 176 is configured to link the multiple ones of the headers 192 to the shared payload 188, in an embodiment. For example, in an embodiment, each header 192 includes a pointer or another suitable indicator that points to or otherwise indicates a memory location in the memory 172 corresponding to the shared payload 188. In an embodiment, the number of payloads 188 stored in the memory 172 is less than N. In an embodiment, only one shared payload 188 is stored in the memory 172 for all of the N packets to be transmitted.

At block 444, a plurality of instances of the multicast packet are transmitted via one or more network ports 124. For each instance of the multicast packet, the respective header and the shared payload are read from the memory and then the instance of the multicast packet is transmitted via the respective network port 124. The packet processor 112 is configured to read the shared payload 188 and the appropriate header 192 from the memory 172, in an embodiment. For example, the memory interface unit 184 is configured to read the appropriate header 192 and the shared payload 188 from the memory 172, in an embodiment. The memory interface unit 184 is configured to read the appropriate header 192 from the memory 172 in response to receiving a descriptor corresponding to the header 192, and the header 192 points to or otherwise indicates the shared payload 188, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A network switch device, comprising:
a plurality of ports configured to communicatively couple the network switch device to a plurality of network links;
a memory;
a packet processor configured to:
write, to the memory, at least a payload of a multicast packet received via one of the ports in the plurality of ports,
determine that a plurality of instances of the multicast packet are to be transmitted,
generate, using an original header of the multicast packet, one or more additional headers,
write, to the memory, a plurality of headers including (i) the original header, and (ii) the one or more additional headers in the memory,
link each header in the plurality of headers stored in the memory to a location of the payload in the memory, and
transmit a plurality of instances of the multicast packet via multiple ones of the plurality of ports coupled to multiple ones of the plurality of network links including, for each of multiple instances of the multicast packet, reading (i) a respective one of the headers in the plurality of headers from the memory and (ii) the payload from the location in the memory concurrently with transmitting the instance of the multicast packet on a respective network link in the plurality of network links.

2. The network switch device of claim 1, wherein:
the packet processor comprises a packet descriptor generator to generate a packet descriptor corresponding to the multicast packet, wherein the packet descriptor is smaller than the multicast packet and includes at least a portion of the original header of the multicast packet; and includes at least a portion of the original header of the multicast packet; and
the packet processor is configured to:
generate one or more additional packet descriptors corresponding to the one or more additional headers, and
enqueue the packet descriptor and the one or more additional packet descriptors in one or more queues to schedule transmission of the plurality of instances of the multicast packet.

3. The network switch device of claim 2, wherein the packet processor is configured to:
store at least a portion of each one or more additional headers in a corresponding additional packet descriptor, and
write each header in the plurality of headers to the memory after storing the at least the portion of the header in the corresponding descriptor.

4. The network switch device of claim 3, wherein:
the packet processor is configured to shorten each of (i) the packet descriptor and (ii) the one or more additional packet descriptors prior to enqueuing the packet descriptor and the one or more additional packet descriptors in the one or more queues; and
shortening each of (i) the packet descriptor and (ii) the one or more additional packet descriptors includes removing the at least the portion of the corresponding header from the packet descriptor.

5. The network switch device of claim 1, wherein the packet processor comprises a packet header editor configured to edit each of at least some headers in the plurality of headers prior to writing the header to the memory.

6. The network switch device of claim 1, wherein the packet processor comprises a buffer management device configured to:
allocate one or more first buffers in the memory to store the payload of the multicast packet,
allocate a corresponding second buffer to store each header in the plurality of headers, and
link each header in the plurality of headers stored in the memory to the one or more first buffers.

7. The network switch device of claim 6, wherein a size of each first buffer is the same as a size of each second buffer.

8. The network switch device of claim 6, wherein a size of each first buffer is different than a size of each second buffer.

9. The network switch device of claim 1, wherein:
the memory is a first memory;
the network switch device further comprises a second memory;
the packet processor is configured to:
write at least the payload of the multicast packet to the second memory upon receiving the multicast packet,
perform ingress processing functions while the at least the payload of the multicast packet is stored in the second memory,
read the at least the payload of the multicast packet from the second memory in order to write the at least the payload of the multicast packet to the first memory, and
perform egress processing functions while the at least the payload of the multicast packet is stored in the first memory.

10. The network switch device of claim 9, wherein the packet processor comprises:
a first direct memory access (DMA) device configured to write the at least the payload of the multicast packet in the second memory;
a second DMA device configured to read the at least the payload of the multicast packet from the second memory;
a third DMA device configured to write the at least the payload of the multicast packet to the first memory; and
a fourth DMA device configured to, for each of the multiple instances of the multicast packet, read (i) a respective one of the headers in the plurality of headers from the first memory and (ii) the payload from the location in the first memory.

11. The network switch device of claim 10, wherein the first memory and the second memory comprise separate memory devices.

12. The network switch device of claim 10, wherein the first memory and the second memory comprise different portions of a single memory device.

13. A method, comprising:
receiving a multicast packet via one port of a plurality of ports of a network switch device;
storing at least a payload of the multicast packet in a memory device;
determining, with a packet processor of the network switch device, that a plurality of instances of the multicast packet are to be transmitted via multiple ports of the network switch device;
generating, with the packet processor, one or more additional headers based on an original header of the multicast packet;

storing, in the memory device, a plurality of headers including (i) the original header, and (ii) the one or more additional headers;

linking, with the packet processor, each header in the plurality of headers stored in the memory device to a location of the payload in the memory device; and transmitting a plurality of instances of the multicast packet via multiple ports including, for each of multiple instances of the multicast packet, reading (i) a respective one of the headers in the plurality of headers and (ii) the payload from the location in the memory device concurrently with transmitting the instance of the multicast packet on a respective network link coupled to a respective port among the multiple ports.

14. The method of claim 13, further comprising:

generating, with the packet processor, a packet descriptor corresponding to the multicast packet, wherein the packet descriptor is smaller than the multicast packet and includes at least a portion of the original header of the multicast packet; and includes at least a portion of the original header of the multicast packet;

generating, with the packet processor, one or more additional packet descriptors corresponding to the one or more additional headers; and enqueuing the packet descriptor and the one or more additional packet descriptors in one or more queues to schedule transmission of the plurality of instances of the multicast packet.

15. The method of claim 14, further comprising:

storing, with the packet processor, at least a portion of each one or more additional headers in a corresponding additional packet descriptor; and storing each header in the plurality of headers to the memory device after storing the at least the portion of the header in the corresponding descriptor.

16. The method of claim 15, further comprising:

shortening, with the packet processor, each of (i) the packet descriptor and (ii) the one or more additional packet descriptors prior to enqueuing the packet descriptor and the one or more additional packet descriptors in the one or more queues, including removing the at least the portion of the corresponding header from the packet descriptor.

17. The method of claim 13, further comprising editing, with the packet processor, each of at least some headers in the plurality of headers prior to storing the header in the memory device.

18. The method of claim 13, further comprising:

allocating, with the packet processor, one or more first buffers in the memory device to store the payload of the multicast packet;

allocating, with the packet processor, a corresponding second buffer to store each header in the plurality of headers; and linking, with the packet processor, each header in the plurality of headers stored in the memory device to the one or more first buffers.

19. The method of claim 18, wherein allocating each second buffer comprises allocating a second buffer having a size equal to a size of each first buffer.

20. The method of claim 18, wherein allocating each second buffer comprises allocating a second buffer having a size different than a size of each first buffer.

21. The method of claim 13, wherein:

the memory device is a first memory device;

the method further comprises:

writing at least the payload of the multicast packet to a second memory device after receiving the multicast packet at the network switch device;

performing, with the packet processor, ingress processing functions while the at least the payload of the multicast packet is stored in the second memory device;

reading the at least the payload of the multicast packet from the second memory device in order to write the at least the payload of the multicast packet to the first memory device; and performing, with the packet processor, egress processing functions while the at least the payload of the multicast packet is stored in the first memory device.

22. The method of claim 21, further comprising:

writing the at least the payload of the multicast packet to the second memory device with a first direct memory access (DMA) device;

reading the at least the payload of the multicast packet from the second memory device with a second DMA device;

writing the at least the payload of the multicast packet to the first memory device with a third DMA device; and for each of the multiple instances of the multicast packet, reading (i) a respective one of the headers in the plurality of headers from the first memory device and (ii) the payload from the location in the first memory device with a fourth DMA device.

23. A network switch device, comprising:

a plurality of ports;

a memory;

a packet processor configured to:

write, to the memory, at least a payload of a multicast packet received via one of the ports in the plurality of ports, determine that a plurality of instances of the multicast packet are to be transmitted, generate, using an original header of the multicast packet, one or more additional headers, write, to the memory, a plurality of headers including (i) the original header, and (ii) the one or more additional headers in the memory, link each header in the plurality of headers stored in the memory to a location of the payload in the memory, generate packet descriptors corresponding to the multicast packet and the one or more additional headers, wherein each packet descriptor is smaller than the multicast packet and includes at least a portion of the corresponding header, shorten each packet descriptor, including removing the at least the portion of the corresponding header from the packet descriptor, after shortening the packet descriptors, enqueue the packet descriptors in one or more queues to schedule transmission of a plurality of instances of the multicast packet, and transmit the plurality of instances of the multicast packet via one or more ports including, for each of multiple instances of the multicast packet, reading (i) a respective one of the headers in the plurality of headers from the memory and (ii) the payload from the location in the memory.

24. A method, comprising:

receiving a multicast packet via one port of a plurality of ports of a network switch device;

storing at least a payload of the multicast packet in a memory device;

determining, with a packet processor of the network switch device, that a plurality of instances of the multicast packet are to be transmitted via one or more ports of the network switch device;

generating, with the packet processor, one or more additional headers based on an original header of the multicast packet;

storing, in the memory device, a plurality of headers including (i) the original header, and (ii) the one or more additional headers;

linking, with the packet processor, each header in the plurality of headers stored in the memory device to a location of the payload in the memory device;

generating, with the packet processor, packet descriptors corresponding to the multicast packet and the one or more additional headers, wherein each packet descriptor is smaller than the multicast packet and includes at least a portion of the corresponding header;

shortening, with the packet processor, each packet descriptor, including removing the at least the portion of the corresponding header from the packet descriptor;

after shortening the packet descriptors, enqueuing the packet descriptors in one or more queues to schedule transmission of the plurality of instances of the multicast packet; and transmitting a plurality of instances of the multicast packet via one or more ports including, for each of multiple instances of the multicast packet, reading (i) a respective one of the headers in the plurality of headers and (ii) the payload from the location in the memory device.

\* \* \* \* \*